Figure 1:
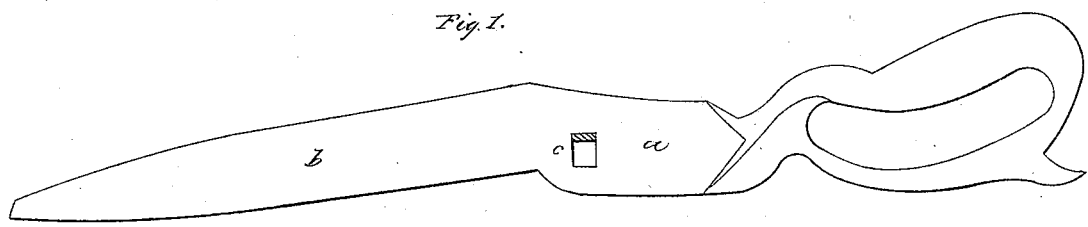
Figure 2:
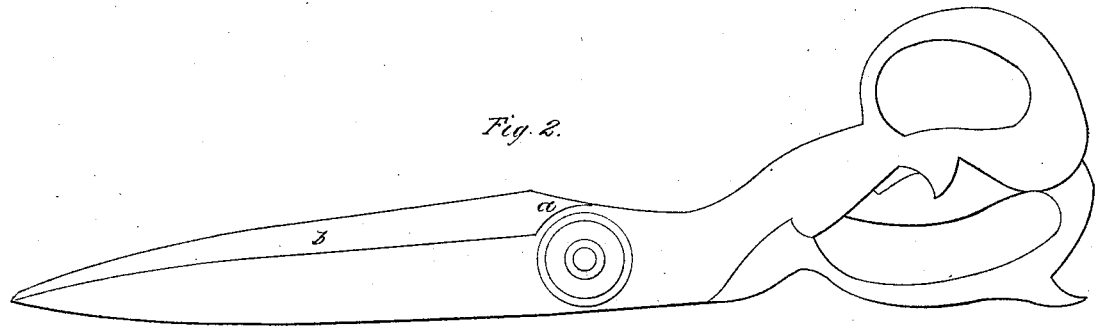
Figure 3:
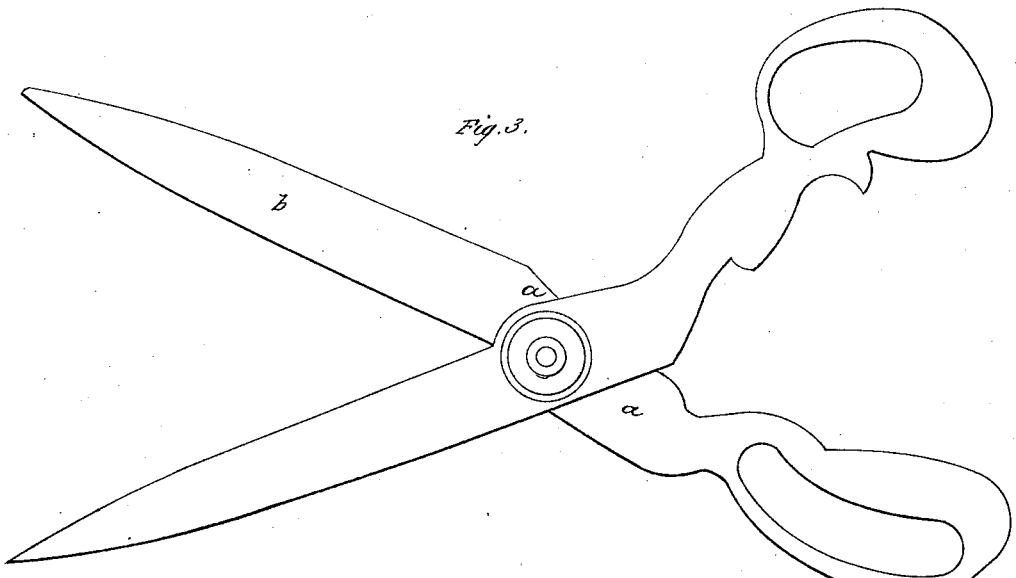

R. Heinisch.
Shears.

N° 37,689. Patented Feb. 17, 1863.

UNITED STATES PATENT OFFICE.

ROCHUS HEINISCH, OF NEWARK, NEW JERSEY.

IMPROVEMENT IN SHEARS.

Specification forming part of Letters Patent No. 37,689, dated February 17, 1863.

*To all whom it may concern:*

Be it known that I, ROCHUS HEINISCH, of t' e city of Newark, county of Essex, and State of New Jersey, have invented certain new and useful Improvements in Shears or Scissors for the Use of Tailors and others; and I do hereby declare the following to be a full and exact description thereof, reference being had to the accompanying drawings, and the letters of reference marked thereon.

Figure I shows the inside of the upper half of the shears. Fig. II shows the shears complete, with the blade closed; and Fig. III shows them open, as preparatory for cutting.

The nature of my invention consists in forming the upper blade of shears or scissors in such a manner that when opened without inconvenient extension the whole length of the edges can be at all times employed for cutting. I can best describe the shape in which I form this blade by supposing the back part of the shank-plate and the point of the blade secured in a vertical position. Then drive or bend the blade and shank upward from a point at the base of the blade, so as to cause the blade and the shank to form an obtuse angle with each other, the lower edge of the shank-plate being left sufficiently depressed to receive the clamp-rivet, so that it may be near to or upon the line of the cutting-edge, as shown in Fig. I. I also employ one or more thin blocks or wedges upon the upper or lower side of the holding-shank of the clamp-screw, and I elongate the slot therefor, as shown at $c$, Fig. I. As the cutting-edges are ground away I change a wedge from the lower to the upper side of the shank, which serves to keep the cutting-edges in proper vertical contact for use and wear.

I claim—

1. Shears, the upper blade of which is formed out of line with the shank, as described, being so bent that the cutting-edge shall fall nearly or quite in line with the rivet or clamp screw and cross the shank in a diagonal line in its direction, and so that when the shears are closed the back of the upper blade shall present a hip-like elevation coincident with such recession of the blade, all as shown and described.

2. In combination therewith the extension-wedges, as shown and described.

R. HEINISCH.

Witnesses:
    WM. HINNES,
    ALBERT HEINISCH.